Aug. 15, 1944.  K. A. R. WAHLSTEDT ET AL  2,356,108
LOADING APPARATUS
Filed June 19, 1943  3 Sheets-Sheet 3
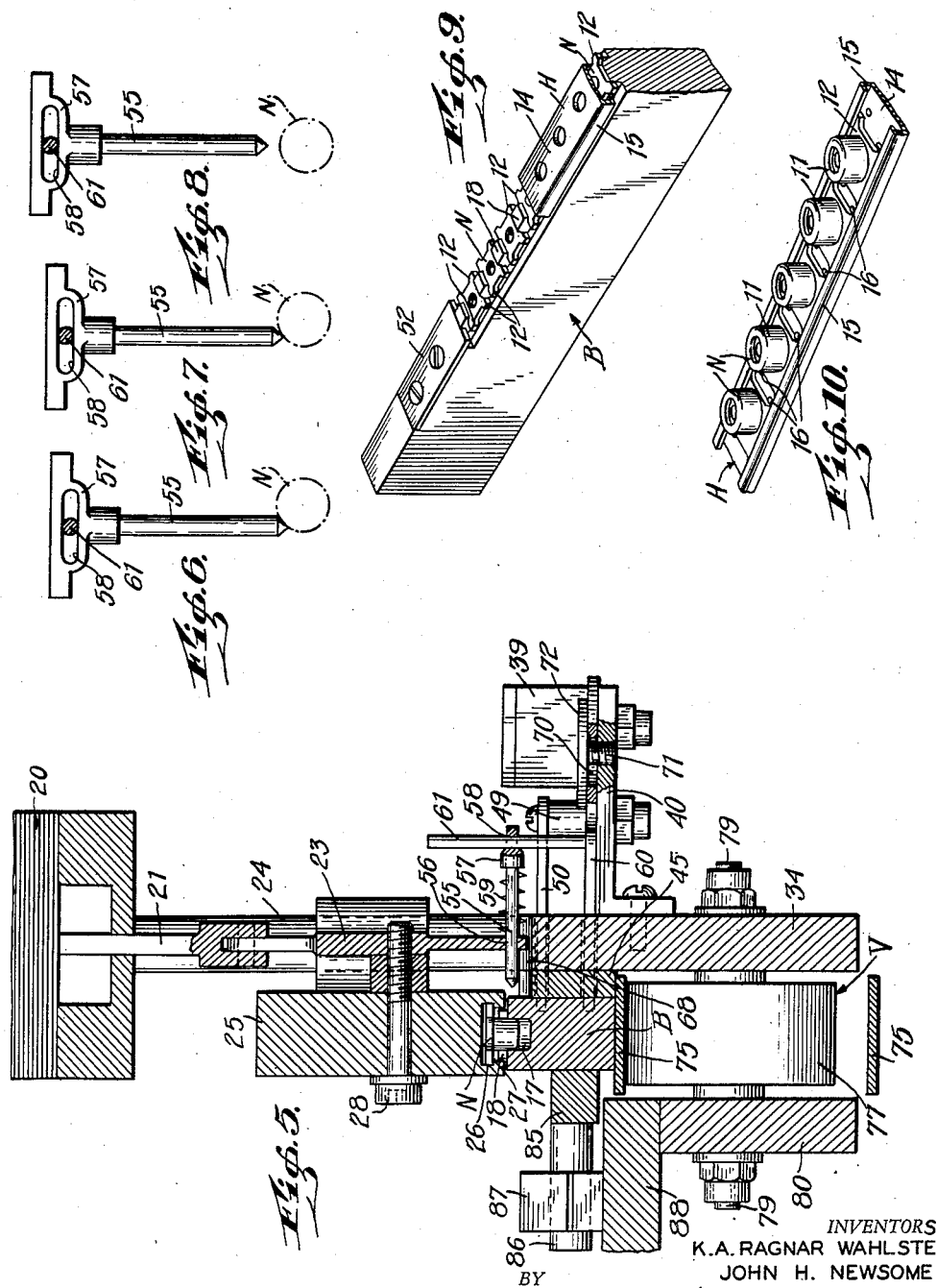
INVENTORS
K.A. RAGNAR WAHLSTEDT
JOHN H. NEWSOME
BY
Horace B. Van Valkenburgh
ATTORNEY Patented Aug. 15, 1944

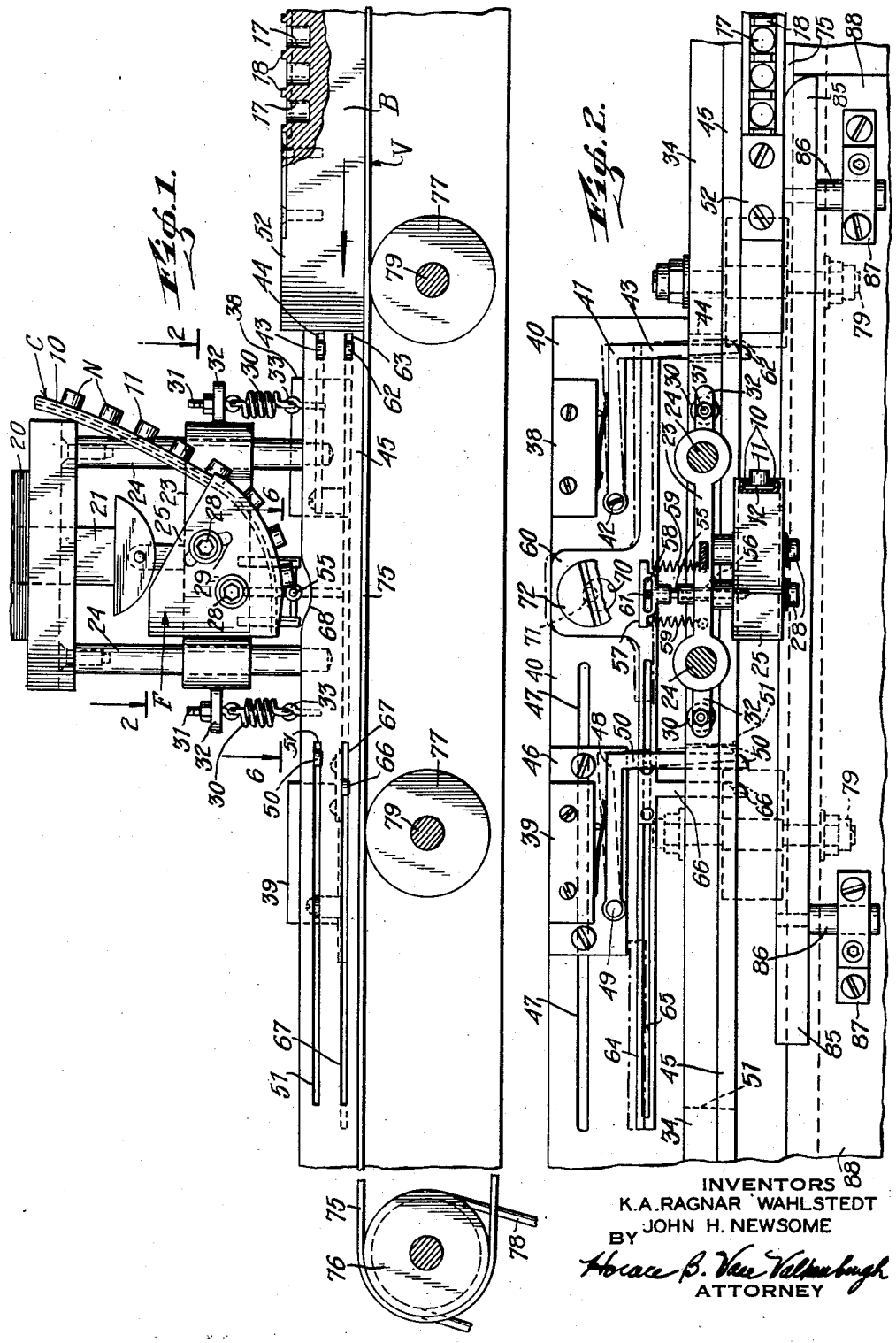
Aug. 15, 1944.  K. A. R. WAHLSTEDT ET AL  2,356,108
LOADING APPARATUS
Filed June 19, 1943   3 Sheets-Sheet 1
INVENTORS
K.A.RAGNAR WAHLSTEDT
JOHN H. NEWSOME
BY
ATTORNEY

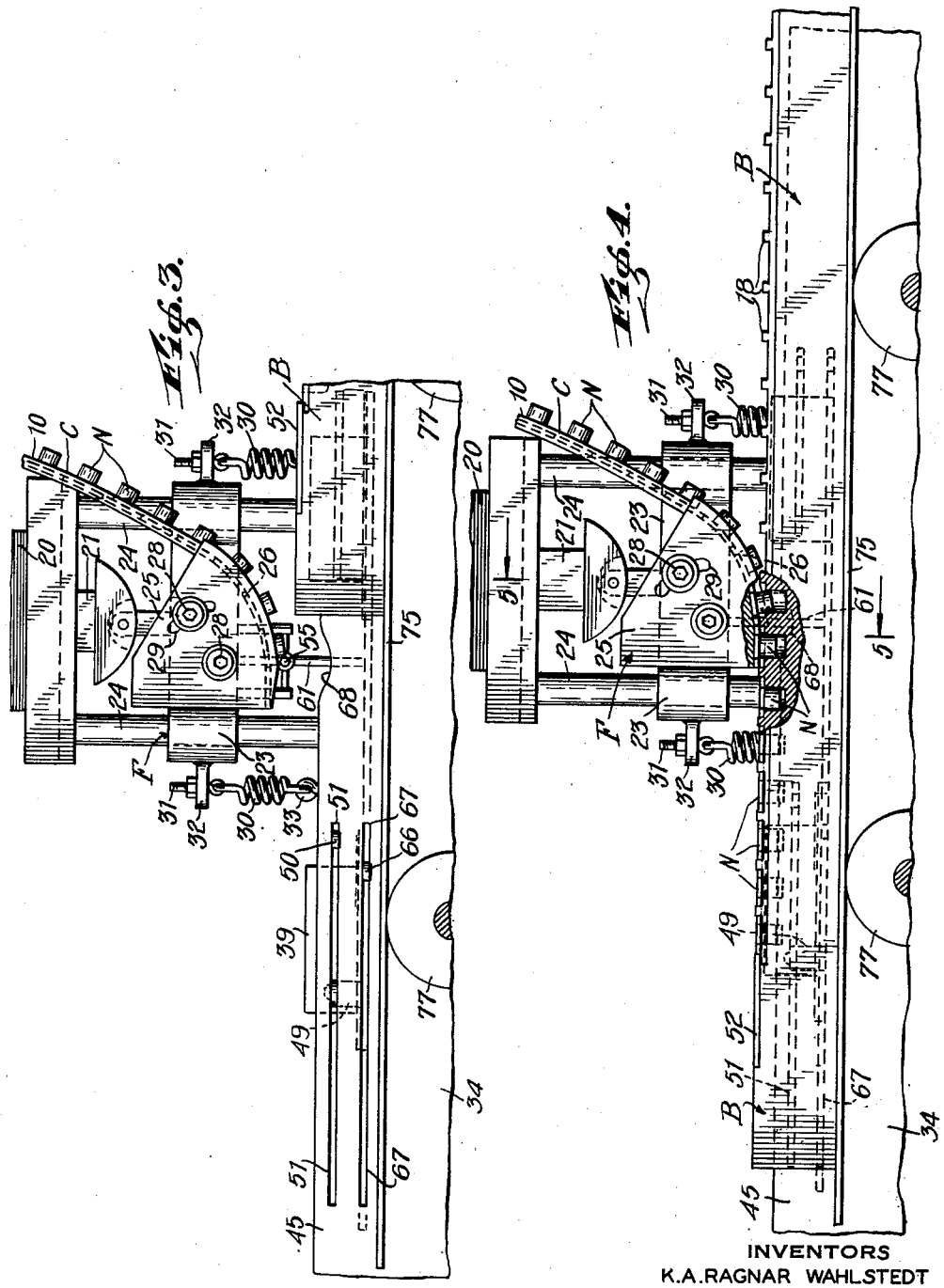

2,356,108

UNITED STATES PATENT OFFICE 2,356,108

LOADING APPARATUS

Karl Axex Ragnar Wahlstedt, East Orange, and John H. Newsome, Rahway, N. J., assignors to Elastic Stop Nut Corporation of America, a corporation of New Jersey Application June 19, 1943, Serial No. 491,572

9 Claims. (Cl. 10—162)

This invention relates to loading apparatus, and more particularly to apparatus for loading a plurality of articles into a receiver for the same—whether the articles be finally retained in such receiver, or the receiver be merely useful in assembling such articles in or attaching such articles to another part.

This invention may be embodied in apparatus for loading a plurality of nuts into an assembly bar, in which the nuts are retained in a desired position while a channel is placed over them and a crimping or dimpling operation performed on the channel so that the nuts will be secured in the channel. Such gang channel nut assemblies, as they are sometimes termed, are useful particularly for blind mountings wherein the nuts are inaccessible during final assembly of two or more parts of aircraft or the like, and a plurality of nuts must be secured in position on one part prior to final assembly.

Nuts for use in such channels may include a cylindrical body or section having a threaded bore and at one end a base having lugs extending radially outwardly. The base may be retained between the side walls of a channel, which side walls have inwardly extending upper edges and restrain the nut from axial and lateral movement, but normally permit the nut to slide longitudinally. To retain the nuts in a desired longitudinal position—such as over holes pierced in the bottom or web of the channel so that a bolt or the like may extend therethrough and into threaded engagement with the nut—the bottom or web of the channel is dimpled, i. e., upwardly extending projections are punched in the web. These projections or dimples restrain each nut from more than a limited longitudinal movement in the channel.

To maintain the nuts and channel in desired position during dimpling, the bar is provided with holes to receive the cylindrical sections of the nuts, each nut being disposed in the bar with its base up. The channel may be inverted and slid over the nut bases, to remain so while the dimpling operation is performed in a punch press or the like, the projections being punched in a downward direction into the web of the inverted channel. Previously, the nuts were placed in the bar by hand, which is clearly a tedious and time-consuming operation, inasmuch as a six foot length of channel may carry fifty or a hundred or more nuts.

Among the objects of this invention are to provide novel loading apparatus by which a plurality of articles may be delivered to a receiver, such as a bar or the like having holes, adapted to receive the articles; to provide such apparatus by which a plurality of articles may be delivered to such a receiver, wherein loading may be automatically stopped as soon as one receiver is full and while another receiver is being brought into loading position; to provide such apparatus in which the receiver moves past a loading point, and at least a portion of the apparatus is moved relatively to the receiver to permit the front end of the receiver to clear the first article, and such portion of the apparatus is then moved to begin automatic delivery of the articles to the receiver; to provide loading apparatus by which a plurality of nuts may be loaded into an assembly bar having holes for receiving the nuts in inverted position, wherein a plurality of bars are moved in succession past a loading point and automatically receive the requisite quota of nuts; to provide loading apparatus which is substantially completely automatic; and to provide such apparatus which is readily adjustable to accommodate different sizes of articles or receivers, and which is efficient and effective in operation. Other objects and novel features will become apparent from the following description and accompanying drawings, in which:

Fig. 1 is a side elevation of loading apparatus embodying this invention, adapted to deliver a plurality of nuts to an assembly bar;

Fig. 2 is a plan view of the apparatus of Fig. 1, taken partially in section along line 2—2 of Fig. 1;

Fig. 3 is a side elevation, similar to Fig. 1, illustrating a different position of the parts;

Fig. 4 is another side elevation, similar to Figs. 1 and 3, illustrating a a still different position of the parts;

Fig. 5 is an enlarged vertical section taken along line 5—5 of Fig. 4;

Fig. 6 is a fragmentary plan view illustrating the position of a restraining pin, when the parts of the apparatus are in the positions shown in Figs. 1 and 2;

Fig. 7 is a fragmentary plan view, illustrating the position of the restraining pin when the parts are in the position shown in Fig. 3;

Fig. 8 is a fragmentary plan view illustrating the position of the restraining pin when the parts are in the position shown in Fig. 4;

Fig. 9 is a perspective view of the forward end of the assembly bar, with the channel being slid over the nuts; and Fig. 10 is a perspective view of the completed channel, dimpled to restrain longitudinal movement of the nuts.

Apparatus constructed in accordance with this invention may, as in Fig. 1, include a feed device F for feeding a plurality of nuts N to a receiver therefor, such as a bar B, which is carried under the feed device in the direction of the arrow of Fig. 1 by a conveyor V. The feed device F is adapted to be shifted upwardly as the forward end of the bar approaches, so that the front end of the bar will not strike any of the nuts to push them out of the feed device. When the bar reaches a predetermined point, the feed device F is lowered, and loading of the nuts begins substantially automatically. Loading is continuous as long as the bar is travelling along beneath the feed device. In further accordance with this invention, restraining means is provided for preventing nuts from falling out of the feed device after the rear end of the bar has passed, and the position of such restraining means is automatically determined by the relative position of a receiver with respect to the feed device.

The nuts N, as in Figs. 1 and 2, are fed to feed device F by a chute C which is provided with turned over side walls 10 forming a slot in the bottom through which cylindrical bodies 11 of the inverted nuts extend. Radially extending lugs 12, which form the base of each nut, slide along the side walls and prevent the nut from turning. The chute C may be similar to a channel H which is slipped over the nuts, as in Figs. 9 and 10, after the bar is full. The channel H comprises a base 14 and side walls 15 having turned over edges adapted to retain lugs 12 of the nuts. The outline of the base of the nut is generally square, to fit between the side walls of the channel and prevent twisting or lateral movement of the nuts, and also to fit beneath the edges of the side walls and prevent axial movement. As in Fig. 10, the base of the channel is dimpled to provide projections 16, which limit longitudinal movement of the nuts in the channel. These projections are formed in suitable apparatus, such as a press, the nuts being held in desired relation to the channel during the dimpling or pressing operation by the assembly bar B.

To receive the nuts, bar B is provided with a plurality of holes 17, as in Figs. 1 and 2, each adapted to receive a body 11 of a nut. Upstanding projections 18 are disposed between holes 17, and are rectangular in shape so that the nuts are prevented from turning while in the bar. Projections 18 do not extend the full width of the bar, thus providing clearance for the turned over edges of the side walls 15 of the channel when the channel is slipped over the nuts.

The feed device F, as in Figs. 1 and 2, is moved upwardly and downwardly by a solenoid 20, the plunger 21 of which is connected to a slide 23, guided by a pair of posts 24 and having attached thereto a block 25 of the feed device. As in Fig. 5, the underside of block 25 is cut away to provide a passage 26 which forms an extension of chute C, and downwardly extending ears 27 through which the projections 18 pass, to insure that the bar and feed device are maintained in accurate alignment at all times. If desired, the chute C may extend substantially to the lower end of the block, to eliminate joints in the passage down which the nuts pass. Thus, the block 25 may comprise a pair of side plates between the lower ends of which the chute is clamped in a suitable slot in each plate, with a spacing block between the plates above the chute.

Block 25 is preferably angularly adjustable on slide 23 in any suitable manner, as by bolts 28 and arcuate slot 29 in the block. The angular position of block 25 with respect to bar B is preferably so adjusted that the angle of approach of the nuts is such that a projection 18 will not catch in the bore of a nut, but the edge of the nut will slide over projection 18 and into a hole 17. The most suitable angle for any particular set-up will depend, of course, upon many factors, some of which cannot be determined in advance. In general, however, if there is a tendency for the nut bores to catch on projections 18, the angle between passage 26 and bar B should be increased by loosening bolts 28, tilting block 25 upwardly, and then tightening the bolts.

Due to inertia, or other causes such as stiffness of feed chute C, it may prove desirable to provide means for moving the feed device downwardly at a faster rate than that at which it would otherwise fall. For this purpose, resilient means comprising a pair of springs 30 may be provided. The upper end of each spring 30 is hooked into an eye bolt 31, which is adjustable vertically—to change the tension of a spring as desired—on an ear 32 which extends outwardly from the end of slide 23. The lower end of each spring is hooked into an eye bolt 33 which is threaded into a suitable tapped hole in a bar 34 on which posts 24 and other parts of the apparatus are mounted. A pair of springs may be provided to equalize forces, but it will be understood that only one spring may be used, if desired, or the feed device may be pulled downwardly hydraulically, or in any other effective manner. Also, it will be found in numerous instances that the normal fall of the parts is sufficiently rapid, so that the springs or other means may be dispensed with altogether.

Current to the winding of the solenoid is supplied through a circuit which includes a normally open switch 38 and a normally closed switch 39, actuated as described below by movement of bar B. When the front end of the bar approaches the feed device, switch 38 is closed, so that with switch 39 in its normally closed position, the solenoid is actuated to lift the feed device. When the front end of the bar reaches a predetermined position past the feed device, switch 39 is opened so that, with switch 38 remaining closed, the solenoid circuit is broken and the feed device drops. When the rear end of the bar approaches the feed device, switch 38 is again opened, so that later closing of switch 39, when the rear end of the bar reaches the predetermined position, has no effect on the solenoid circuit because it is broken at switch 38.

For closing the normally open switch 38—mounted on a support 40 attached to bar 34—a lever 41 is pivoted on a pin 42. A right-angle arm 43 of lever 41 extends through a slot 44 in bar 34 and a plate 45, the latter forming one wall of the passage through which the bar B is conveyed. When the front end of the bar contacts arm 43 of lever 41, to move it to the dotted position of Fig. 2, the circuit to the solenoid is closed, and the solenoid is actuated, thereby lifting the feed device F to its upper position, such as the position of Fig. 3.

The normally closed switch 39 is mounted on a plate 46, which is adjustable along a slot 47 in support 40. Plate 46 carries a lever 48, pivoted on a pin 49, for opening the normally closed switch. The end of right-angle arm 50 of lever 48 extends through an elongated slot 51 in bar 34 and plate 45, and is depressed, as to the dotted position of Fig. 2, when the front end of the bar reaches it. This opens the normally closed switch 39, thus breaking the circuit to the solenoid winding and causing the feed device to drop. When the rear end of the bar reaches arm 43 of lever 41, switch 38 is restored to its normally open position, so that when the rear end of the bar later leaves lever 47 and switch 39 resumes its normally closed position, the circuit to the solenoid will remain broken. Thus, the feed device will remain in the down position until the next bar comes along.

The position of lever 41 may be fixed for substantially all bars, since the solenoid raises the feed device to prevent the front end of the bar from striking parts thereof or nuts contained therein. However, the position of lever 48 and switch 39 is preferably adjustable along a relatively wide range, in accordance with possible variations in bars—and more particularly variations in the distance between the front end of the bar and the first hole 17, which distance may vary in accordance with the size of nut or channel and type of press used.

The position of plate 46 preferably is adjusted so that switch 39 will be opened by the front end of the bar striking arm 50 just before the first hole 17 is in position to receive a nut from the feed device. It will often prove desirable to lower the feed device shortly before the time the first hole and nut register exactly, letting the first nut ride for a short distance on the upper surface of the bar, to insure that the nut drops into the first hole at the desired time. To prevent undue wear, a hardened plate 52 may be attached to the upper surface of the bar ahead of the first hole.

The restraining means referred to previously, as in Figs. 2 and 5, may include a pin 55 journaled in a bearing hole 56 in slide 23, and attached to a double armed fork 57, having a transverse slot 58. A tension spring 59 is attached to the end of each arm of fork 57 and to slide 23. Pin 55 is moved inwardly and outwardly by pivoting of a lever 60, with which the pin is connected by a stud 61 which extends upwardly from lever 60 and through slot 58, to permit the pin and fork to move upwardly and downwardly with slide 23.

The various positions of pin 55 are shown in Figs. 6 to 8, inclusive. When no nuts are being loaded, pin 55 is in the full locking position of Fig. 6, the beveled point of the pin extending inwardly into substantially full contact with the body of the nut, to prevent any forward movement thereof. When pin 55 is moved to the position of Fig. 7, its point makes lesser contact with the nut but prevents the nut from falling out of the feed device by gravity, or by the weight of the nuts above it in the chute, or to be pulled out by friction due to the nut riding on plate 52. Pin 55 is in the position shown in Fig. 8 when the feed device is raised to clear the front end of the bar. During loading, pin 55 is in the position of Fig. 8—clear of all nuts and permitting free flow of the nuts through the feed device into the bar. While the last few nuts are being loaded into the bar, the pin rides against the side of the bar, so that as soon as the rear end of the bar passes, the pin will snap into the position of Fig. 7. A short time after the rear end of the bar passes the pin, the pin moves in further, to the position of Fig. 6, where it remains until another bar approaches.

To move pin 55 to the above positions at the desired times, lever 60 has two arms. As in Figs. 2 and 3, one is a right-angle arm 62 which extends through a slot 63 in plate 45, at a position substantially beneath slot 44 so that arm 62 will be depressed substantially simultaneously with arm 43 for closing switch 38. The other arm 64 of the lever is relatively long and provided with an elongated slot 65, along which is adjustable an extension 66. Extension 66 extends through an elongated slot 67, as in Fig. 1, beneath and substantially parallel to slot 51 in plate 45, and may be adjusted to a position corresponding to but slightly beyond lever 48, so that extension 66 will be depressed by the bar shortly after lever 48. Supporting bar 34 and plate 45 are provided with a machined groove 68, or the like, to provide clearance for pin 55 in its movement in any of the possible positions to which it may be adjusted.

When arm 62 of lever 60 is pushed in by the front end of the bar, to the dotted position of Fig. 2, lever 60 pivots in a counterclockwise direction and pin 55 is moved back from the position of Fig. 6 to that of Fig. 7, substantially simultaneously with upward movement of the feed device. When extension 66 is also pushed in by the front end of the bar, to the dotted position of Fig. 2, lever 60 pivots further in a counterclockwise direction and pin 55 is moved back further, to the position of Fig. 8. Preferably, this occurs at the same time that the first nut enters the first hole 17, with the feed device dropping slightly before that time. Since the bar maintains arm 62 and extension 66 in the dotted positions of Fig. 2 during substantially the entire loading operation, pin 55 remains in the position of Fig. 8. However, when the rear end of the bar passes, arm 62 moves back to the full position of Fig. 2 and lever 60 pivots in a clockwise direction, but since extension 66 is still depressed, the pin will tend to move only to the position of Fig. 7. While the last few nuts are being fed into the bar, pin 55 rides against the side of the bar, but as soon as the end of the bar passes the pin, it will snap to the position of Fig. 7, thus preventing any more nuts from flowing from the feed device. Then, when the end of the bar passes extension 66, lever 60 pivots in a clockwise direction back to its original position, which moves pin 55 back to the position of Fig. 6, where it remains until the front end of the next bar depresses arm 62.

To permit the foregoing movements of lever 60, a lost motion connection is provided in the central portion of the lever, as in Figs. 2 and 5, by a hole 70 having a considerably greater diameter than a pin 71, on which the lever may pivot. Pin 71 may comprise a machine screw or the like, having a relatively large head 72 adapted to cover hole 70 and hold the lever to support 40. Normally, springs 59 keep the far edge of hole 70 pulled over against pin 71, so that the lever pivots about pin 71 as a fulcrum, when either arm 62 or extension 66—but not both—are depressed. However, when both arm 62 and extension 66 are depressed, pin 71 does not touch any of the periphery of hole 70. Rather, lever 60 floats, as it were, pin 55 remaining in the position of Fig. 8 and the lever being held back against the pressure of springs 59 by engagement of both arm 62 and extension 66 with the bar, as it moves along beneath the feed device. When the rear end of the bar passes arm 62, lever 60 again pivots about pin 71. It is desirable that the rear end of one bar be past arm 66 before the next bar contacts arm 62, to prevent pin 55 from being moved to the position of Fig. 8 when there is no bar in position to receive nuts.

For moving the bars past the feed device at a desired rate, conveyor V comprises a continuous belt 75, driven by a pulley 76 and passing over idler rollers 77. Pulley 76 may be driven by suitable means, such as a belt 78 connected to a conventional source of power, as an electric motor or the like. Rollers 77 and pulley 76 may be suitably journalled, as on shafts 79 supported on one side by plate 34 and on the other side by a plate 80, as in Fig. 5.

For maintaining bar B in alignment, a guide 85 is provided on the opposite side of the passage from bar 34. Guide 85 is curved at the entrance, as in Fig. 2, to more readily guide the bar into the desired path. The clearance between plate 45 and guide 85, respectively, on either side of the bar, is not critical, since as long as the lower end of the nut body fits into one of the holes adapted to receive it, the nut will be accurately deposited in the bar. However, such clearance should be sufficiently small so that projection 18 will fit readily between ears 27 when the feed device is dropped down onto the bar as the first nut is being fed. For adjusting such clearance, guide 85 may be supported by studs 86 extending from pillow blocks 87, in turn attached to a supporting base 88, as in Fig. 5.

During operation of the apparatus just described, the nuts may be fed to chutes C in any suitable manner, preferably by a machine which automatically aligns them in the correct position. Suitable for this purpose is a selective feed hopper—such as a type wherein the wall of the hopper is provided on its under side with a plurality of slots corresponding to the body of a nut, with clearance between the hopper and the base plate sufficient to accommodate the lugs. Such a hopper operates most effectively when mounted at an angle, and there is only one position in which the nuts can flow out—with the lugs down against the base plate, in which position the nuts pass into chute C. However, to be fed properly into bar B the lugs must be inverted, and for inverting the nuts, the chute C may have a reverse bend in it, i. e., slant downwardly at a suitable angle, such as 45°, from the hopper, then curve around through a vertical position and then back under itself to feed device F. The angle at which the chute meets the feed device may be steeper than 45°, such as 70° or the like, as shown. The end of the chute moves upwardly or downwardly with the feed device and the normal resiliency of the chute will usually be found sufficient to accommodate the movement. If the movement appears to be damaging the chute—and particularly the repeated reversal of stress—the chute may be provided with one or more hinged joints to accommodate the movement of the lower end of the chute.

Although this invention has been explained in connection with a bar utilized in retaining nuts in a desired position while a channel is fitted thereover and a dimpling operation is then performed on the channel so that the nuts will be retained in the channel, it will be understood that the principles of this invention may be applied in many other instances. For instance, the articles may be fed into a receiver in which the articles remain during subsequent treatment—such as heat treatment or the like—and the articles are removed after treatment, without having been connected to any other part. Or, articles formed of two or more pieces may be fed in assembled relation to a receiver and the pieces welded, brazed, or otherwise suitably secured together. These examples are to be construed as suggestive, and not as limitative, as other examples will readily suggest themselves to those skilled in the art.

It will further be understood that various changes in the apparatus may be made. For instance, the feed device may be moved upwardly and downwardly by hydraulic, air, or other suitably operated mechanism, rather than electrical; any suitable mechanism for feeding the nuts in the correct position to the feed device, other than that described, may be utilized; other restraining means, in substitution for pin 55 and its attendant parts, may be utilized; common levers may operate the restraining pin 55 and the switches controlling the solenoid; and the restraining means may be shifted by pneumatic, electric, or other suitable means, rather than mechanical. In addition, articles having entirely different sizes and shapes may be loaded into a receiver for the same; the receiver may be the part in which the articles are finally retained; and the receiver may be passed alongside, or even above, the feed device, rather than beneath. In the latter instance, in order that the first article will not strike the end of the receiver, the feed device may be moved horizontally or even downwardly as the end of the receiver approaches. Furthermore, rather than the feed device being moved, the front end of the receiver may be moved downwardly or in any other suitable direction in order to avoid striking the first article. It will further be understood that additional changes, both in structure and in the application of the invention, are possible without departing from the spirit and scope thereof, as defined in the appended claims.

What is claimed is:

1. Loading apparatus comprising a device for feeding a plurality of nuts or the like to a bar provided with holes for receiving said nuts, said device having a passage along which nuts may flow; means for supporting said device with said passage in an inclined position whereby said nuts slide downwardly by gravity; a conveyor for moving said bar along a path passing underneath at least the end of said device; and means for moving at least the end of said device generally upwardly and downwardly.

2. Loading apparatus as defined in claim 1, in which said means for moving said device generally upwardly and downwardly includes a solenoid controlled by switches, and means for actuating said switches operable by said bar during its movement along said path.

3. Loading apparatus as defined in claim 1, including resilient means for moving said device downwardly toward said receiver.

4. Loading apparatus comprising a device for feeding a plurality of articles to an elongated receiver adapted to receive said articles in spaced positions therealong; a conveyor for moving said receiver along a path passing into loading position with respect to said device; and means for moving said device toward and away from the path of movement of said receiver, said means being actuated by said receiver during its movement and adapted to move said device away from said receiver as the forward end of said receiver approaches said device and to move said device toward said receiver and into loading position after the forward end of said receiver has passed said device.

5. Loading apparatus as defined in claim 4, wherein said articles comprise nuts or the like and said receiver comprises a bar having holes for receiving such nuts.

6. Loading apparatus as defined in claim 4, wherein said receiver is provided with holes into which said articles are adapted to be fed, and said receiver is provided with a hardened portion ahead of the first hole to prevent wear by an article sliding along said receiver before being placed into the first hole, as said device is moved toward said receiver.

7. Loading apparatus comprising a device for feeding a plurality of articles to a receiver therefor; means for effecting a relative movement between said device and said receiver during a loading operation; means for restraining movement of articles from said feed device at predetermined times; and control means operable in accordance with the relative position of said receiver with respect to said feed device for varying the position of said restraining means, said control means being constructed and arranged to cause said restraining means to exert the greatest restraining effect when there is no receiver in loading position, and to exert the least restraining effect during feeding of the articles to a receiver.

8. Loading apparatus as defined in claim 7, wherein said articles include a rounded portion, and said restraining means comprises a pin extending inwardly toward such rounded portion, along the path of travel of said articles through said device.

9. Loading apparatus comprising a device for feeding a plurality of anchor nuts into a bar provided with holes for receiving said nuts, each nut having a body adapted to extend downwardly into one of said holes and each nut also having a base adapted to be positioned so that a channel may be slipped over the bases of the nuts in a bar and said nuts thereby accurately positioned within said channel; said device having a passage similar in cross-section to said channel; a chute also similar in cross-section to said channel and having a return bend therein whereby a nut may be fed into the upper end of said chute with the body thereof extending upwardly, and said nut passing downwardly along said chute will reverse its relative position so that the body will extend downwardly and said nut will be conveyed into the passage of said device with its body extending downwardly; a movable support for said device; a solenoid having a plunger adapted to move said support upwardly and downwardly; a normally open switch having an actuating lever extending to a point along the path of travel of said bar prior to said device; a normally closed switch having an actuating lever extending to a point beyond said device along the path of travel of said bar; an electrical circuit including said solenoid and both said switches; a pin adapted to restrain the flow of nuts from said passage; resilient means urging said pin inwardly toward the nuts at the discharge end of said passage; a lever for said pin, having at one end an arm extending to a point along the path of travel of said bar prior to said device and at the other end an arm extending to a point along the path of travel of said bar past said device; a pivot; and a connection between said pivot and said lever permitting movement of said lever away from and back to said pivot.

KARL AXEX RAGNAR WAHLSTEDT.
JOHN H. NEWSOME.